INVENTORS
EMIL HOPNER
HANS R. ULANDER

BY Stephen J. Limanek
ATTORNEY

3,293,361
TRANSMISSION SYSTEMS

Emil Hopner and Hans R. Ulander, Yorktown Heights, N.Y., assignors to International Business Machines Corporation, New York, N.Y., a corporation of New York Filed Dec. 18, 1962, Ser. No. 245,540
6 Claims. (Cl. 178—69)

Figures 1, 3, 5:
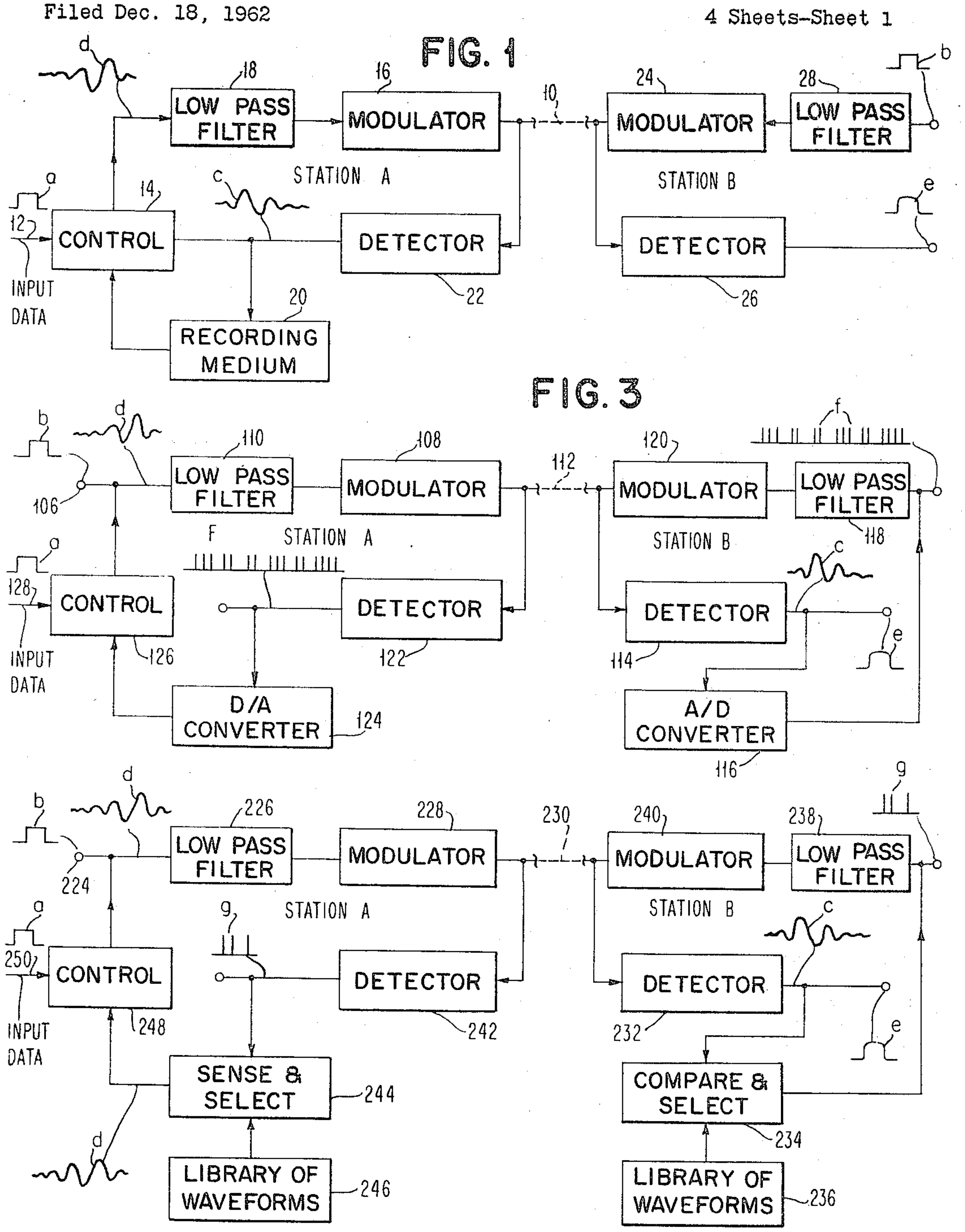

This invention relates to digital data transmission systems and more particularly to systems for transmitting digital data at very high rates.

As is known, binary digits or bits "1" and "0" are generally represented in electronic data machines or computers by first and second direct current levels, respectively. Thus, a "1" bit may be indicated by an electrical pulse or square wave having a given positive or negative magnitude and a "0" bit may be indicated by a pulse of a polarity opposite to that of the "1" pulse, or by the absence of a bit, i.e., by a zero magnitude.

In creasing size and speed of computer systems along with the growth of the concept of centralized data processing has created new requirements for increased speed and reliability of digital communications for long distance transmission of signals. Many system applications are being based upon modes of communications in which different combinations of computers and peripheral equipment from remote locations are tied together.

There are two main types of long transmission lines presently available for the transmission of digital signals to or from computers. The most common communication transmission line is the telephone line designed primarily to carry voice messages. The second type of transmission line is the microwave beam system which in its commercial application has a very broad bandwidth. The present day commercial television channels utilize microwave beam systems. These television channels are well suited for computer-to-computer communications since they have been designed for transmission of pulses that are similar to the binary signals used in computers.

Although the microwave beam systems are very desirable for computer-to-computer communications, these systems are relatively expensive to install and to maintain and are not as common as are the telephone transmission lines. Accordingly, in many instances, telephone circuits must be relied upon for digital data transmission. Although telephone lines have operated very satisfactorily for voice transmission, distortion in these lines which delays certain frequencies in the spectrum of a pulse or square wave more than other frequencies causes a spreading of each individual pulse as it passes through the line. This distortion affects the phase and amplitude of waveforms passing through these lines. Voice signals in the lines are generally not sufficiently distorted so as to prevent detection thereof at the receiving end of the line by the human ear. However, when pulses, particularly square waves each having a given time duration, are transmitted through telephone lines, the arrival waveform corresponding to each transmitted pulse has a time duration which is many, often 10 or more, times the given time duration of the originally transmitted pulse. The portion of the arrival wave which persists beyond the time corresponding to the given time duration of the transmitted pulse is commonly referred to as intersymbol interference. If a train or series of closely spaced pulses are transmitted, the received pulses may be unreadable due to the intersymbol interference. As a consequence of this intersymbol interference, pulses must be transmitted at a slow rate in order to resolve the received pulses or symbols.

Attempts have been made heretofore to eliminate or at least reduce linear distortion in transmission lines. A technique has been suggested of shaping an input signal for systems whose transforms are known. It has been shown that a predistorted waveform exists which when impressed upon a transmission line results in a pulse output having a desired relatively short time duration. Another solution which has been proposed involves modification of the distorted received signal from a prior knowledge of the system parameters. It has been further suggested to provide phase correction in a transmission line by time reversal techniques. A pulse was transmitted through a transmission loop and recorded in a magnetic tape recorder. Then the tape was played backwards to retransmit the signals through the loop so that frequency components of the received signal which were delayed the most were retransmitted first and those components which suffered the least delay were transmitted last.

It is an object of this invention to provide an improved transmission system for digital data signals.

Another object of this invention is to provide an improved digital signal transmission system employing standard telephone lines and broadband circuits.

A further object of this invention is to provide an improved system for reducing effects of phase distortion.

Yet another object of this invention is to provide a transmission system which compensates for line distortion by adapting itself automatically to any one of many lines having different phase characteristics.

Still another object of this invention is to provide a system for transmitting pulses at a high pulse rate.

Yet a further object of this invention is to provide a high pulse rate transmission system which utilizes predistorted waveforms.

Still a further object of this invention is to provide a high pulse rate transmission system which is flexible and simple.

In accordance with this invention a system is provided which compensates for phase distortion in a line by adapting itself automatically to each line used. In this system a pulse of a given duration is applied to a generator which produces in response thereto a predistorted waveform of substantially longer duration than that of the pulse dependent upon a characteristic of the medium through which pulses are to be transmitted. Means are provided for overlapping the predistorted waveforms so as to permit the transmission of information by closely spaced pulses having a high repetition rate.

An important advantage of the transmission system of the present invention is that pulses are received at the receiver of the transmission system having linear distortion therein which have a shape or form similar to the pulses applied to the input of the transmitter of the transmission system.

An important feature of the system of the present invention is that due to its flexibility it is capable of rapidly compensating phase distortion regardless of which one of many possible lines it may employ.

Another important feature of the system of the present invention is that distortion introduced by the linear modulator and demodulator, required for transmission of waveforms and elimination of any spectrum shift introduced by the line, is compensated equally well as the distortion introduced by the line.

The foregoing and other objects, features and advantages of the invention will be apparent from the following more particular description of preferred embodiments of the invention, as illustrated in the accompanying drawings.

Figures 2, 2A:
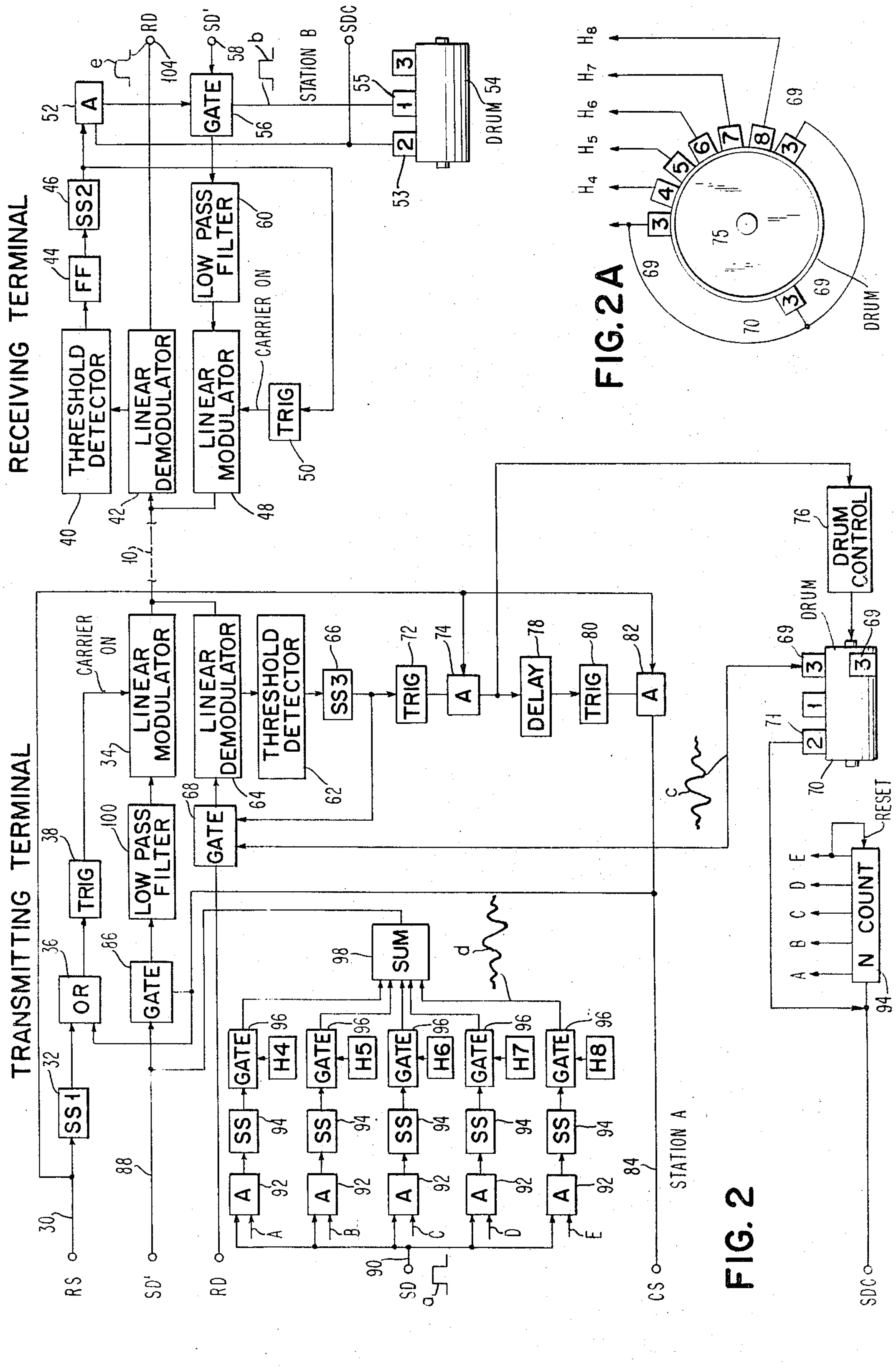
Figures 4, 4A:
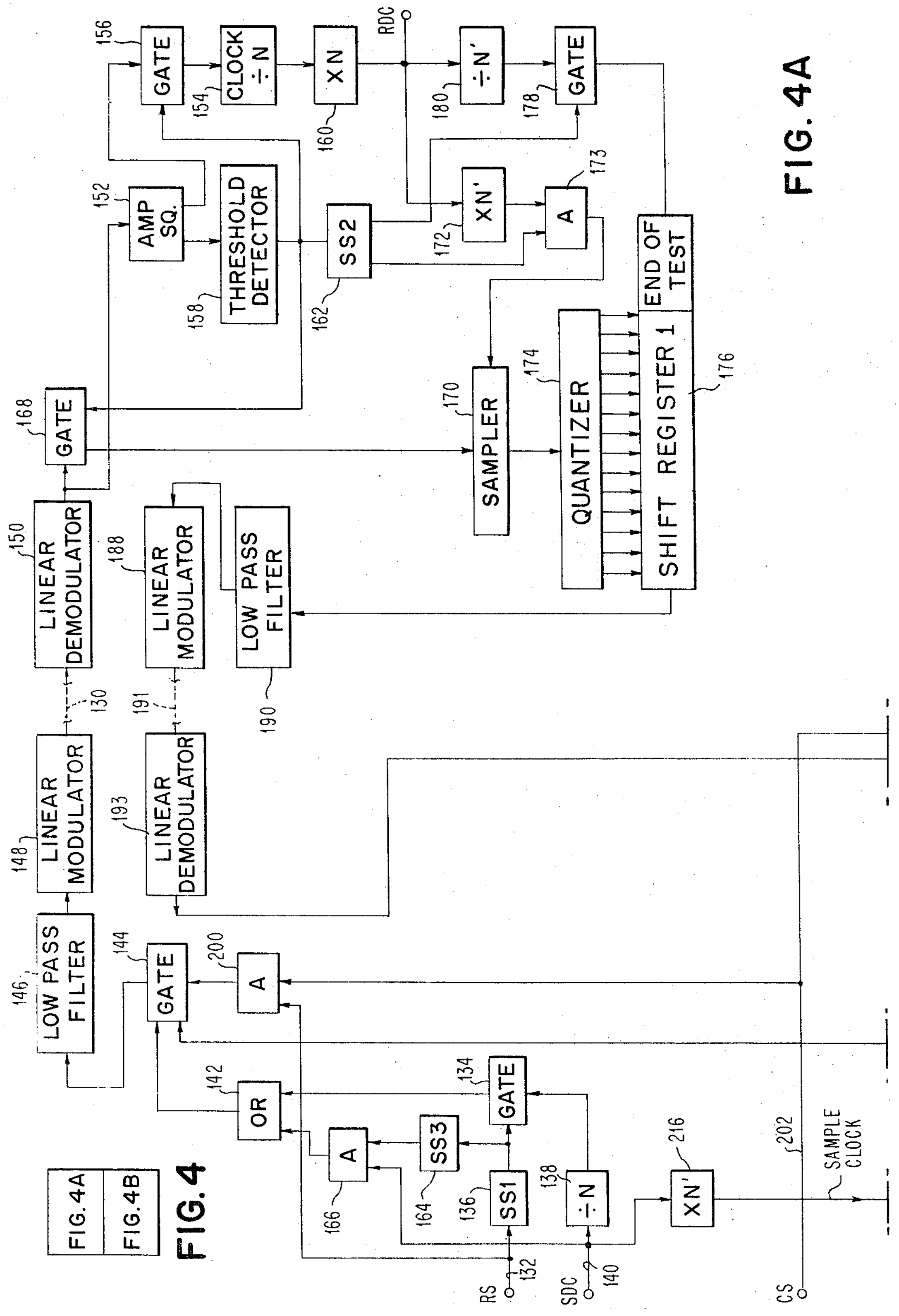
Figure 4B:
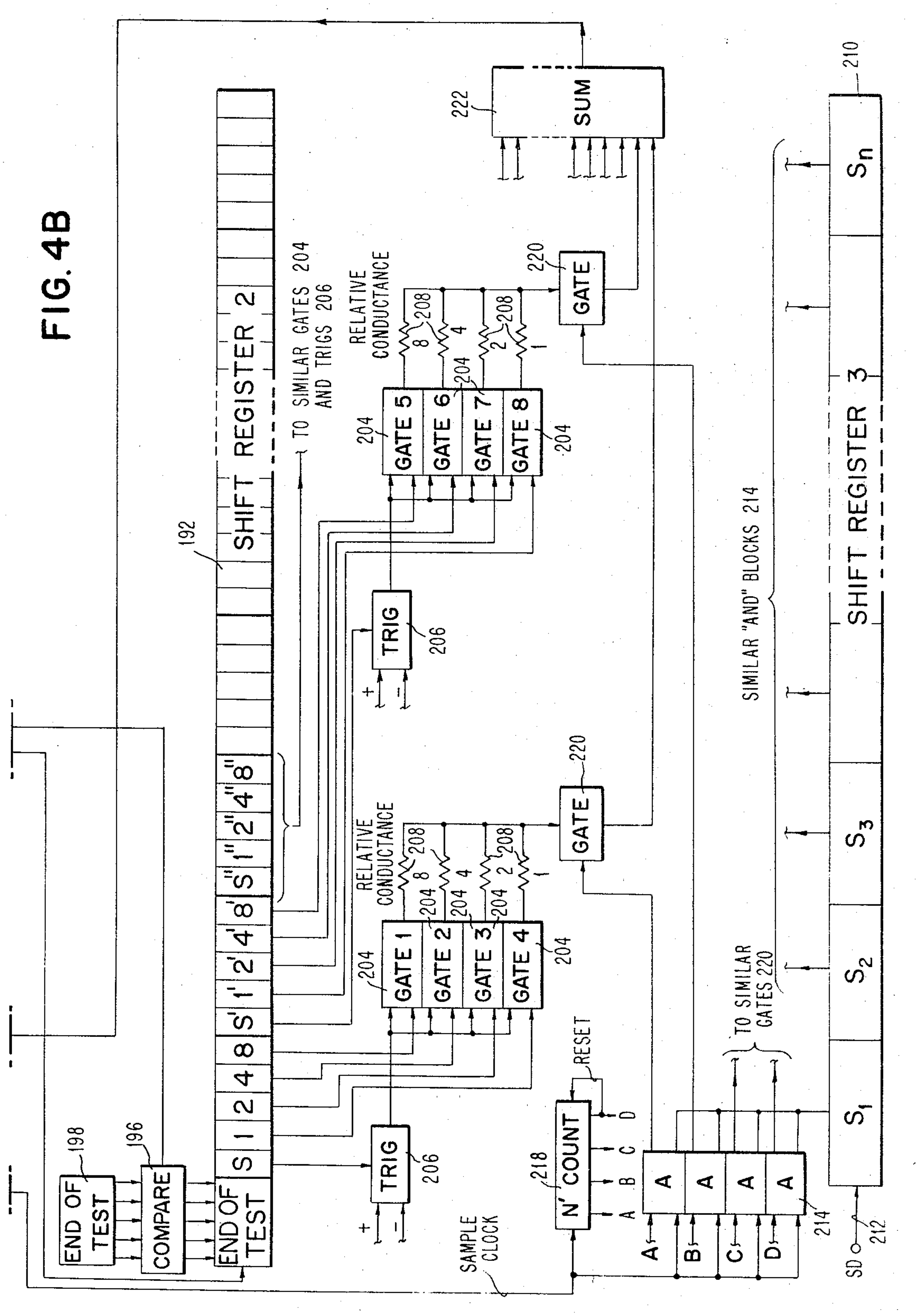

In the drawings:

FIG. 1 illustrates, in block form, one embodiment of the system of the present invention, FIGS. 2 and 2*a* show in more detail the system illustrated in FIG. 1 of the drawing, FIG. 3 illustrates, in block form, a second embodiment of the system of the present invention, FIGS. 4, 4*a* and 4*b* show in more detail the system illustrated in FIG. 3 of the drawing and FIG. 5 illustrates a third embodiment of the system of the present invention.

Referring to FIG. 1 of the drawing in more detail, there is shown a station A and a station B which are intercoupled by a transmission medium 10, for example, a standard telephone line. The station A includes an input line 12 coupled to a control circuit 14 having a first output connected to a modulator 16 through a low pass filter 18. A second output of the control 14 is connected to a recording medium 20, the output of which is coupled to an input of the control 14. The transmission medium 10 is coupled through a detector 22 to the recording medium 20 and also to the output of the modulator 16. Station B includes a modulator 24 and a detector 26 each coupled to the transmission medium 10, modulator 24 and detector 26 having characteristics similar to those of station A, modulator 16 and detector 22, respectively. A low pass filter 28 is provided at the input of the modulator 24 which is similar to station A low pass filter 18.

In the operation of the embodiment of the system of the present invention illustrated in FIG. 1 of the drawing, when station A desires to transmit data from the input line 12 to station B, station B transmits through the low pass filter 28 and the modulator 24 to station A a pulse or square wave *b* having a form similar to that of the pulses on the input line 12 indicated at *a*. The pulse *b* is received in the station A detector 22 in a form *c* considerably modified from the form of pulse *b*, including a length having a time duration many times the duration of the pulse *b*. The distorted wave *c* is recorded in the recording medium 20. The recording medium 20 may be, for example, a magnetic drum which is rotating in a given direction while recording the waveform *c*. When it is desired to transmit data from the input line 12 to station B, each of the digital data pulses *a* applied to the control circuit 14 from the input line 12 permits the passage of a time reversed waveform *c*, which appears as waveform *d*, through the control 14, the low pass filter 18 and the modulator 16 to the transmission medium 10. The time reversal of waveform *c* may be accomplished simply, for example, by reversing the direction of rotation of the magnetic drum of the recording medium 20. Since the waveform *d* has a time duration which in general is many times the duration of the pulse *a*, the waveforms *d* which are transmitted in a rapid succession by the application of the pulses *a* to the control circuit 14 often overlap each other to provide further distortion of the pulses or signals transmitted through the modulator 16 and transmission medium 10 to the detector 26 of station B. However, due to the symmetrical characteristics of the system and since waveforms *d* are a time reversed wave of wave *c*, the predistorted waves after passing through detector 26 of station B are transformed into a substantially square pulse *e* which has substantially the same waveform as pulse *a* in the input line 12 of station A. Since waveform *e* is substantially similar to waveform *a*, it can be seen there is little or no intersymbol interference between the received pulses. Accordingly, the received pulses *e* may be readily resolved at station B and, therefore, transmission through the transmission system of the present invention may be performed at higher rates than have been performed heretofore in transmission systems having linear phase distortion.

In FIGS. 2 and 2*a* of the drawing there is shown in more detail an embodiment of the system of the present invention similar to that illustrated in FIG. 1 of the drawing. In the system illustrated in FIGS. 2 and 2*a*, a station A, which is assumed to be a station desiring to transmit data, is coupled through a transmission medium 10, for example, a standard telephone line, to a station B which is to receive digital data signals from station A. When station A is prepared to transmit data to station B through the transmission medium 10, a request-to-send line 30 is energized by application thereto of a suitable voltage which sets a first single shot multi-vibrator 32 to turn on a carrier oscillator in a linear modulator 34 which is coupled to the single shot 32 through an OR circuit 36 and a trigger circuit 38. At station B, a threshold detector 40 coupled to the output of a linear demodulator 42 senses the presence of the carrier wave and sets a flip-flop 44. When the first single shot 32 resets after a period sufficiently long for station B to recognize the condition of the request-to-send line 30, the flip-flop 44 sets a second single shot 46 which turns on a carrier oscillator in linear modulator 48, coupled to the output of the second single shot through a trigger circuit 50, and also conditions an AND circuit 52. A timing pulse from a head 53 of a rotating magnetic drum 54 further conditions the AND circuit 52 so that a gate 56 is set to pass a test pulse *b* from a second head 55 of the drum 54, recorded on a separate track of the drum 54, to the linear modulator 48 through a low pass filter 60. The second single shot 46 is adjusted to reset after a passage of time sufficiently long to assure transmission of the test pulse *b* after which the second single shot 46 turns off the carrier oscillator in the linear modulator 48.

At station A a threshold detector 62 coupled to a linear demodulator 64 senses the presence of the carrier wave from the linear modulator 48 of station B and sets a third single shot 66 which conditions a gate 68 to pass the received test pulse to a write head 69 of a magnetic drum 70, which is rotating in a given direction. A third single shot 66 is adjusted to reset after a period of time sufficiently long, for example, many times the time duration of the transmitted test pulse *b*, to receive and record the test pulse. The originally transmitted test pulse *b* now has been distorted by the communication channel so as to be spread over several bit periods to appear in a form indicated at *c*. When the third single shot 66 resets, the gate 68 is conditioned to prevent further recording on the drum 70 and sets a trigger 72 to condition an AND circuit 74. Since the request-to-send line 30 is energized, the output of the AND circuit 74 applies a voltage to a drum control circuit 76 which causes the direction of rotation of the drum 70 to be reversed, i.e., to rotate in a clock-wise direction as indicated by the arrow 75 on drum 70, illustrated in FIG. 2*a* of the drawing. After a delay, produced by delay circuit 78, sufficiently long for the drum 70 to attain its speed in the clockwise direction, AND circuit 74 sets a trigger 80, coupled to one input of an AND circuit 82, the other input thereof being connected to the request-to-send line 30, that energizes a clear-to-send line 84, conditions a gate 86 for transmission of data through a first send data line 88, and turns on the carrier oscillator in the linear modulator 34.

Data to be transmitted from station A to station B enters a second send-data line 90 clocked in a plurality of AND circuits 92 by a timing signal derived from one of the tracks on the drum 70 via one of the read heads 71 thereof, and an N count circuit 94 sequentially supplying the timing signals to inputs A, B, C, D, and E of the respecitve AND circuits 92. A data pulse representing a binary one, or a binary zero depending on code convention used, conditions one of the AND circuits 92 depending upon which AND circuit 92 has simultaneously applied thereto a pulse from the N count circuit 94. The output of each conditioned AND circuit 92 sets a single shot 94 that conditions a gate 96 to pass a waveform *d* which is the time reversed waveform of a recorded waveform *c* from one of the read heads $H_4$, $H_5$, $H_6$, $H_7$, and $H_8$ of drum 70, illustrated in FIG. 2*a* of the drawing, corresponding to the conditioned gate 96. The waveform *d* is applied to the first send-data-line 88 through a summing network 98. Although only five AND circuits 92 and associated single shots 94, gates 96 and read heads $H_4$, $H_5$, $H_6$, $H_7$ and $H_8$ are illustrated in the drawing, it should be understood that as many AND circuits 92 and associated circuitry may be used depending upon the maximum spread of the distorted test pulse *d* in bit positions or intervals. Furthermore, it should be noted that when successive bit periods each have a data pulse, the first waveform *d* is transmitted in its entirety through the summing network 98 with the onset of a second waveform *d* transmitted through the summing network 98 one bit period later. Accordingly, the output signal from the summing network 98 will be the algebraic sum of the two waveforms *d* passing through the summing network 98. Of course, it is possible for each of the gates 96 to be simultaneously energized so as to produce an output wave from the summing network 98 which is the algebraic sum of all of the waves passing through the gates 96 in a time displaced relationship to each other. The signals passing through the summing network 98 are applied to the linear modulator 34 through gate 86 and a low pass filter 100. After passing through the transmission medium 10 the waveforms or signals are demodulated in the linear demodulator 42 and passed to a terminal 104 of station B to which may be coupled any suitable utilization device, e.g., a computer or magnetic tape recorder not shown. The signals received at terminal 104 are substantially square pulses as indicated at *e*, the wave *e* having a waveform substantially similar to that of the waveform of the pulse *a* in the second send-data line 90.

Depending on drum size and speed, several uniformly spaced write heads 69 may be used to record the received waveform *c*, however, only one set of read heads uniformly spaced between the right heads 69 is required.

Upon completion of transmission of data the request-to-send line 30 is de-energized or turned off, the clear-to-send line 84 is de-energized and station A is conditioned to receive a new test pulse *b* when the request-to-send line 30 is again turned on or to send a test pulse applied to the first send-data line 88, if requested by station B.

Although in the system illustrated in FIGS. 2 and 2*a* of the drawing there is shown transmission of a test pulse only from station B to station A, it should be understood that additional circuitry similar to that described hereinabove may be added to the system to permit duplex operation.

The embodiments of the system of the present invention illustrated in FIGS. 1, 2 and 2*a* of the drawings are suitable for use when the system employs a symmetrical communication channel, that is, when a test pulse transmitted from station A to station B is received in a given distorted waveform and when the same test pulse transmitted from station B is received at station A in the same given distorted form. Since many channels are asymmetrical rather than symmetrical, an embodiment of the present invention which is suitable for use with asymmetrical channels is illustrated in FIG. 3 of the drawing.

A test pulse *b* corresponding in form to a data pulse *a*, which is to be transmitted from station A to station B, is applied to a terminal 106 of station A, coupled to a modulator 108 through a low pass filter 110, for transmission through a transmission medium 112, for example, a telephone line, to a detector 114 of station B. The waveform of the originally transmitted test pulse at the output of detector 114 is indicated as a distorted waveform *c*. The waveform *c*, as explained hereinabove in connection with the embodiment illustrated in FIG. 1, has a duration of many time intervals of test pulse *b*. The distorted waveform *c* is applied to an analog-to-digital converter 116 where it is sampled and quantized so as to be retransmitted to station A in the form of coded pulses indicated at *f*. The coded pulses *f* which represent the magnitude, the polarity, and position of samples of waveform *c* are retransmitted to station A at a slow rate through a low pass filter 118, a modulator 120, and the transmission medium 112. At station A the coded pulses *f* are passed through a detector 122 to a digital-to-analog converter 124 which substantially reconstructs the distorted waveform *c* in time reversed form. A control circuit 126 is provided for controlling the output of the digital-to-analog converter upon the application thereto of data pulses *a* from an input line 128.

After the time reversed waveform *c*, which is indicated at *d*, is stored in the digital-to-analog converter 124, the embodiment of the system of FIG. 3 operates in a manner similar to the embodiment illustrated in FIG. 1 of the drawings. Accordingly, it can be seen that even though the system of the present invention employs an asymmetrical transmission channel, the phase distortion in the channel, which distorts the test pulse *b*, can be compensated by employing the hereinabove described sampling techniques.

In FIGS. 4, 4*a* and 4*b* of the drawing there is illustrated in more detail, an embodiment of the present invention utilizing sampling techniques which may be used in asymmetrical transmission systems. FIG. 4 shows the spatial relationship between FIGS. 4*a* and 4*b*. Referring now to FIGS. 4*a* and 4*b*, when data is to be transmitted from station A to station B via a communication channel 130, a request-to-send line 132 has a voltage applied thereto so as to be energized to set a first gate 134, coupled to a first single shot multivibrator 136. The setting of the first gate 134 permits a subcycle ·/. N clock 138 having a repetition rate equal to *SDC/N*, coupled to a signal data clock terminal 140 having a clock rate SDC, to apply its output through an OR circuit 142 and a second gate 144 normally conditioned by AND circuit 200 to pass the output of OR circuit 142 to low pass filter 146 which eliminates most harmonics in transmitted pulses or signals before they are applied to a linear modulator 148. N is chosen to assure a fundamental frequency within the pass band of the communication channel 130. At station B the communication channel 130 is coupled to a linear demodulator 150, the output of which is fed to an amplifier and squarer 152 having an output coupled to a subcycle clock *SDC/N* 154 after a third gate 156 is set by a threshold detector 158. The output of the subcycle clock 154 is multipled by N at XN clock 160 to provide a clock signal at the baud or bit per second rate RDC. A second single shot 162 is also conditioned by the threshold detector 158. The second single shot 162 is set at the number of bit periods over which a test pulse is to be sampled. At the transmitter, the first single shot 136 which was set by the voltage on the request-to-send line 132 resets after a period of time sufficiently long to establish the desired operation of the clock 160 at station B. After this period of time a third single shot 164 is set conditioning AND circuit 166 to permit a test pulse, which is one period of the SDC clock at terminal 140, to pass through to the linear modulator 148 via the OR circuit 142, the second gate 144, and the low pass filter 146. The third single shot 164 resets after the test pulse period. At station B a gate 168 is conditioned by threshold detector 158 to pass the test pulse to a sampler 170 which is driven at N′ times the baud rate by an XN′ clock 172. N′ is chosen to provide a sufficient number of samples per bit period to adequately define the received waveform, this number should be greater than twice the highest frequency component present in the signal to be reconstructed. The second single shot 162 conditions an AND circuit 173 to permit the sampler 170 to be driven by the clock 172 only after the clock 172 is properly synchronized. The output from the sampler 170 which is applied to a quantizer 174 consists of a series of pulses having amplitudes and polarity corresponding to the received waveform at the sampling time. Each of the pulses of this series of pulses is quantized in quantizer 174 into a sufficient number of levels plus a sign to adequately represent the received waveform. For purpose of description only, five bits are used, one for the sign or polarity and four bits for the magnitude which makes it possible to distinguish 16 different amplitudes of both positive and negative polarities for each sample. The output of the quantizer 174 is stored in a first shift register 176 which is sufficiently large to store all quantized samples over previously selected bit periods depending upon the received waveform of the test pulse. A few additional bit positions are provided in the first shift register 156 to store an end-of-test character.

The second single shot 162 resets after the selected period and conditions a fourth gate 178 which permits the contents of the first shift register 176 to be shifted out serially to a linear modulator 188 through a low pass filter 190 at a slow rate *RDC/N''* by application to the first shift register 176 of pulses from a clock 180. The rate *RDC/N''* is selected to be sufficient slow so as not to distort the information as it is transmitted from station B to station A.

At station A, a second shift register 192, shown in FIG. 4*b* of the drawing, is used to store the quantized samples of the test pulse after passing through a channel 191 and a linear demodulator 194. A compare circuit 196 coupled to an end-of-test generator 198 and the second shift register 192 recognizes the end-of-test character and conditions the second gate 144 via an AND circuit 200, to which the request-to-send line 132 is also connected for subsequent transmission of data from station A. The compare circuit 196 also provides a clear-to-send signal on line 202 to associated data equipment. The output from the second shift register 192 conditions a number of gates 204 required for magnitude and a trigger 206 required for sign or polarity. Each of the gates 204 are shown coupled to a relative conductance 208 having a value 1, 2, 4 or 8, respectively, forming a digital to analog converter. Although only one trigger 206 and four gates 204 for two samples are shown in the drawing, it should be understood that a trigger and four gates are required for each of the samples taken in sampler 170.

Data which is to be transmitted from station A to station B is shifted into a third shift register 210 from an input line 212. If a pulse is stored in the first bit position or first cell $S_1$ of the third shift register 210, the first cell $S_1$ conditions four AND circuits 214 which are also conditioned by the sample clock 216 coupled to terminal 140 and by the outputs from an N' count circuit 218. The output from each AND circuit 214 conditions a gate 220 that connects the output of the stored samples in the digital to analog converter 204, 208 to a summing network 222 and then to the linear modulator 148 via the second gate 144 and the low pass filter 146. The N' count circuit 218 conditions additional AND circuits 214 (not shown) to gate out four samples per bit period for each of the previously selected bit periods depending upon the received waveform at station B of the test pulse. The second bit position or shift cell $S_2$ of the third shift register is capable of conditioning additional circuits to give four samples during its time period. The first bit position $S_1$ now contains the second bit to be transmitted. If the second bit is the same kind as the first bit, samples, time displaced one period, will be added in the summing network 222. The third shift register has as many bit positions as the number of bit periods during which samples were originally taken at station B.

It should be understood that by adding appropriate components to station A which are in station B, and appropriate components which are in station B to station A, duplex transmission may be provided.

In FIG. 4*a* there is shown at station B a sampler, quantizer and shift register capable of storing all the quantized samples from a single test pulse prior to the transmission thereof to station A. However, it should be understood that alternatively a train of test pulses can be transmitted from station A to station B rather than a single test pulse and each received response sampled once at an incrementally later time than the previous pulse. This latter scheme obviates the need for storage at station B of all the quantized samples from a single test pulse, since now the storage requirement can be reduced to the number of bits in one sample, e.g., four or five, because the quantized values can be transmitted from station B to station A at a low rate as received.

Another embodiment of the transmission system in the present invention which may be used when employing asymmetrical channels is illustrated in FIG. 5 of the drawing.

A test pulse *b* is applied to a terminal 224 of station A so as to pass through a low pass filter 226, a modulator 228, a transmission medium 230 to a detector 232 of a station B wherein there is produced at the output of the detector 232 a waveform *c* which is a distorted form of the test pulse *b* due to linear distortions in the system. The waveform *c* is applied to a compare and select circuit 234 which has also applied thereto waves from a library of waveforms 236, the library of waveforms 236 having any number of waveforms of a type which are likely to be produced at the output of the detector 232 by the transmission mediums encountered in a particular area. After the waveform from the library of waveforms 236 which most nearly represents the waveform *c* has been selected by the compare and select circuit 234, coded pulses *g* identifying the selected waveform are transmitted at a slow rate to station A via a low pass filter 238, a modulator 240 and the transmission medium 230. The coded pulses *g* pass through a detector 242 of station A before they are applied to a sense and select circuit 244, which senses the coded pulses *g* and selects a waveform from a library of waveforms 246 corresponding to the selected waveform from the library of waveforms 236 at station B. The selected waveform from the library of waveforms 236 of station A is passed through a control circuit 248 upon the application thereto of data pulses from an input line 250. An alternative method of selecting a waveform is to transmit all the waveforms from the station A library of waveforms 246 in sequence to station B, permitting station B to select the received pulse having the least amount of intersymbol interference. After a waveform has been selected from the library of waveforms 236, the system illustrated in FIG. 5 of the drawing operates in a manner similar to that of the system described in FIG. 3 of the drawing.

Although the test pulses have been illustrated as having a positive polarity, it should be understood that test pulses of negative polarity may also be used in the system of the present invention when the data signals are in the form of negative pulses. Furthermore, it should be noted that the present invention is not limited to the transmission of only square waves, since signals of other forms can also be reproduced at a receiving station of a transmission system in accordance with the teaching of the present invention.

Means for producing the desired time reversed distorted waveform at the transmitting station of the system have included the digital-to-analog converter illustrated in detail in FIG. 4*b* of the drawing and the magnetic drum type illustrated in FIGS. 2 and 2*a* of the drawing, but other waveform generators such as those described and illustrated in a commonly assigned copending U.S. patent application Serial No. 245,543, filed December 18, 1962 by H. L. Funk on even date, can also be used.

Storage means, particularly at the transmitter of the system of the present invention, may also take the form of a storage tube, or, if desired, storage may be accomplished with the use of capacitors, described hereinabove, the system of the present invention can reliably transmit data at 5000 baud using single sideband binary modulation over ordinary telephone lines having a 2500 cycle per second bandwidth, e.g., 500 to 3000 cycles per second and up to 10,000 baud using quaternary modulation, i.e., with four level signals wherein first binary signal values are indicated by polarity and second binary signal values are indicated by magnitude.

Accordingly, it can be seen that a digital data system has been provided which corrects delay distortion and thereby permits higher transmission speeds over unequalized communication channels. Not only are the effects of phase distortion caused by the transmission line reduced but also the effects of phase distortion caused by the modulator, low pass filters and detectors are reduced.

While the invention has been particularly shown and described with reference to preferred embodiments thereof, it will be understood by those skilled in the art that various changes in form and details may be made therein without departing from the spirit and scope of the invention.

What is claimed is:

1. In a transmission system having a given characteristic which distorts components of a pulse of a given time duration as the pulse passes from a sending end to a receiving end of said system forming at the receiving end a distorted waveform having a duration many times that of said given duration, the combination comprising (a) signal generating means located at said sending end for generating a plurality of signals each one having a time reversed waveform of that of said distorted waveform, (b) a summing network connected at said sending end to transmit waveforms applied thereto and, (c) a control circuit located at said sending end and responsive to the application of a series of data pulses having said given time duration for applying one of said signals for each of said data pulses to said summing network.

2. The combination as set forth in claim 1 wherein said signal generating means includes a recording medium.

3. The combination as set forth in claim 1 wherein said signal generating means includes a digital to analog converter.

4. A transmission system having a given characteristic which distorts components of a pulse of a given time duration as the pulse passes from a sending end to a receiving end of the system forming at the receiving end a distorted waveform having a duration many times that of said given duration comprising (a) a transmission medium located between said receiving and sending ends, (b) means located at said reeciving ends for transmitting said pulse of given time duration through said transmission medium forming said distorted waveform, (c) a recording medium located at said sending end, (d) a detector located at said sending end coupled to said transmission medium for storing said distorted waveform in said recording medium and (e) control means located at said sending end responsive to the application of input data pulses for producing a time reversed waveform of said distorted waveform stored in said recording medium and applying one of said time reversed waveforms to said transmission medium for each of said input data pulses.

5. A transmission system having a given characteristic which distorts components of a pulse of a given time duration passing therethrough comprising (a) a first station, (b) a second station, (c) a transmission medium intercoupling to said stations, (d) means for passing a pulse from said first station to said second station, said second station having an analog to digital converter adapted to receive said pulse and to provide coded pulses representing said received pulse, (e) means for transmitting said coded pulses from said second station to said first station, said first station including a digital to analog converter adapted to receive said coded pulses and to provide a time reversed waveform of the pulse received in said second station and (f) control means responsive to the application of input data pulses for applying the output waveform from the output of digital to analog converter to said transmission medium.

6. A transmission system comprising (a) a first station, (b) a second station, (c) a transmission medium intercoupling said stations, (d) said first station having a sense and select circuit and a first library of waveforms coupled to said sense and select circuit, (e) said second station having a compare and select circuit, (f) means for transmitting a pulse from said first station to said compare and select circuit of said second station and (g) means for transmitting the output of said compare and select circuit to the input of said sense and select circuit of said first station.

References Cited by the Examiner

UNITED STATES PATENTS

| | | | |
|---|---|---|---|
| 1,704,806 | 3/1929 | Nyquist | 178—69 |
| 2,656,410 | 10/1953 | Herrick et al. | 178—5.1 |

FOREIGN PATENTS

| | | |
|---|---|---|
| 161,276 | 1/1953 | Australia. |

NEIL C. READ, *Primary Examiner.*

ROBERT H. ROSE, *Examiner.*

A. J. DUNN, T. A. ROBINSON, *Assistant Examiners.*